Figure 1:
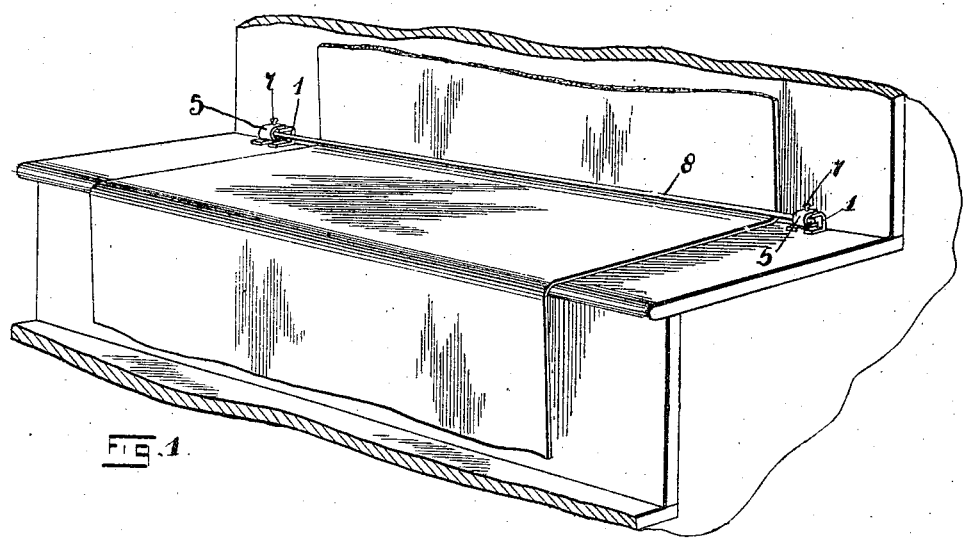

No. 843,521. PATENTED FEB. 5, 1907.
L. DEITRICK.
STAIR ROD FASTENER.
APPLICATION FILED NOV. 24, 1906.

WITNESSES:
Jesse C. Miller

INVENTOR
Louisa Deitrick
BY H. C. Evert & Co.
Attorneys

THE NORRIS PETERS CO., WASHINGTON, D. C.

UNITED STATES PATENT OFFICE.

LOUISA DEITRICK, OF NEW BRIGHTON, PENNSYLVANIA.

STAIR-ROD FASTENER.

No. 843,521.     Specification of Letters Patent.     Patented Feb. 5, 1907.

Application filed November 24, 1906. Serial No. 344,846.

*To all whom it may concern:*

Be it known that I, LOUISA DEITRICK, a citizen of the United States of America, residing at New Brighton, in the county of Beaver and State of Pennsylvania, have invented certain new and useful Improvements in Stair-Rod Fasteners, of which the following is a specification, reference being had therein to the accompanying drawings.

This invention relates to certain new and useful improvements in stair-rod fasteners; and the invention has for its object the provision of novel means for detachably holding a rod upon stairs.

My invention aims to provide positive and reliable means for detachably fastening the ends of a rod to the tread or rise of a step, whereby a carpet held in place by said rod can be easily removed. In this connection my improved fastener is particularly designed for a stairway constructed of wood, a portion of the fastener being permanently fastened to the stairway, while the remaining part of the fastener is detachably connected to the permanent portion. To this end I have devised a fastener adapted to detachably hold one end of a stair-rod, two fasteners being used upon each step to retain a stair-rod in position, and thereby retaining a carpet upon the steps.

The detail construction of my improved fastener will be presently described and then specifically pointed out in the appended claims; and referring to the drawings forming part of this specification like numerals of reference designate corresponding parts throughout the several views, in which—

Figure 2:
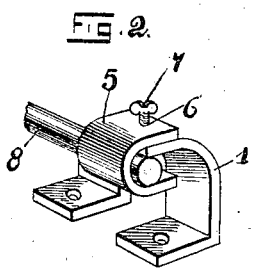
Figure 3:
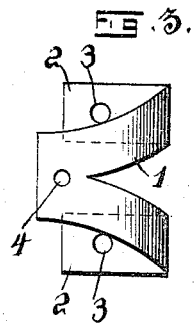
Figure 4:
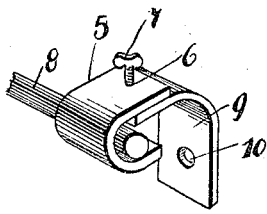

Figure 1 is a perspective view of one of the steps of a stairway equipped with my improved stair-rod fastener. Fig. 2 is a perspective view of one of the stair-rod fasteners. Fig. 3 is a plan of the permanent portion of the fastener, and Fig. 4 is a perspective view of the fastener of a slightly-modified form of construction.

My improved fastener is constructed of light and durable metal and comprises two parts, a permanent part and a movable or detachable member 1. The permanent part is formed of a bifurcated piece of metal, the bifurcated ends 2 of which are provided with apertures 3, whereby said member of the fastener can be secured to the tread of a step by screws or suitable fastening means. The opposite end of the fastener member is provided with a threaded aperture 4.

The movable or detachable member 5 of the fastener consists of a U-shaped piece of metal having a threaded aperture 6 at its one end to receive a set-screw 7, said set-screw being employed to secure the movable or detachable member to the permanent member of the fastener, the set-screw 7 engaging in the threaded aperture 4 of the permanent member. The opposite end of said U-shaped piece of metal is adapted to lie under the end of the permanent member of the fastener and support the end of a stair-rod 8.

By referring to Fig. 2 of the drawings it will be observed that two of my improved fasteners are employed for retaining the stair-rod in position, said rod firmly holding the carpet at the juncture of the thread and rise of a step.

In Fig. 4 of the drawings I have illustrated a slight modification, wherein the permanent member 9 of the fastener is made of a piece of metal having one end provided with a threaded opening similar to the permanent member illustrated in Fig. 3, while its opposite end or vertical portion is provided with an opening 10 to permit of the fastener being secured to the rise of a step.

My fastener is particularly adapted for dark stairways, where considerable trouble is experienced in placing a carpet upon the stairs, and is especially designed for hard-wood stairs, where a portion of the fastener may become a fixture, while the detachable portion of the fastener can be easily removed at any desired time by manipulating the set-screw 7 and releasing the stair-rod and the detachable member of the fastener.

Such changes in the size and proportion of my improved fastener as are permissible by the appended claims may be resorted to without departing from the spirit and scope of the invention.

What I claim, and desire to secure by Letters Patent, is—

1. In a stair-rod fastener, the combination with a rod, of a permanent member adapted to be secured to a step and comprising a bifurcated piece of metal having pierced ends, a movable member detachably connected to one of the pierced ends of said permanent member, said movable member embodying a U-shaped piece of metal adapted to support the end of a stair-rod, and a set-screw connecting said movable member to said permanent member.

2. In a stair-rod fastener, the combination with a rod, of a permanent member adapted to be secured to a step and comprising a bifurcated piece of metal having pierced ends, a movable member detachably connected to one of the pierced ends of said permanent member, said movable member embodying a U-shaped piece of metal adapted to support the end of a stair-rod, and means for detachably connecting said movable member to said permanent member.

In testimony whereof I affix my signature in the presence of two witnesses.

LOUISA DEITRICK.

Witnesses:
    THOMAS J. FIDDLER,
    HARRY CALHOON.